Patented Aug. 8, 1950

2,518,241

UNITED STATES PATENT OFFICE 2,518,241

PRESERVATIVE COMPOSITIONS FOR CELLULOSIC MATERIALS

James F. McCarthy, Mars, Pa., assignor to Treesdale Laboratories, Inc., Allegheny County, Pa., a corporation of Pennsylvania No Drawing. Application May 29, 1945, Serial No. 596,597

1 Claim. (Cl. 260—28)

This invention relates to improvements in compositions for use in the coating and impregnation of woven or matted fibers.

Textiles, paper and similar products when used for protective coverings require special treatment to prevent physical and chemical deterioration thereof occasioned by the elements. For greatest service, this treatment should also impart a reasonable degree of fire resistance to the covering. Tarpaulins, throw cloths, and tenting are examples of types of textile material which should be waterproofed and flameproofed before they may be employed with safety as protective coverings.

Waterproofing compositions embodying waxes, paraffin, rubber, vinyl resins and cellulosic esters are well known. Many of these coating compositions cause a stiffening of the fabrics to which they are applied with the result that the induced brittleness leads to the development of cracks therein. This physical deterioration, not only of the coating but also of the base fabric itself, results in a destruction of the protective characteristics of the treated fabrics. Other coatings harden upon aging, exhibit poor adhesion for the base material, or are dangerously inflammable.

Flameproof characteristics have been added to various waterproofing compositions by the incorporation therewith of relatively incombustible agents or materials which will, upon decomposition induced by heat, release gases incapable of supporting combustion. For example, the deposition of various salts such as, ammonium sulphate, borax, tin chlorides, etc., on and in textile materials has been the most common form of fireproofing.

The chlorinated paraffins are typical of agents which on decomposition release gases tending to smother combustion and have widely adopted as the primary ingredient of many coating compositions. In addition to their flameproofing properties, the chlorinated paraffins will serve also as a waterproofing agent. The chlorinated paraffins are, however, susceptible to decomposition merely on exposure with the release of hydrogen chloride or chlorine, either of which will attack the fibers of the base material with destructive effect. This incipient decomposition of chlorinated paraffin may be arrested by the incorporation therewith of a pigmentary material designed to screen or protect the chlorinated paraffin from the action of deleterious rays. The screening pigments are generally colored and it follows that the treated material will possess the color of the coating composition. In many instances, these colors will be undersirable.

Another disadvantage of the ordinary flame- and waterproofing compositions is the presence therein of a fusible salt, such as zinc borate, to reduce the after-glow property of the treated material. This salt causes tendering and discoloration of the base material but has long been considered an essential ingredient of the coating compositions.

The principal object of the present invention is the provision of a water- and flameproofing composition for textiles and paper products which will avoid the disadvantages of prior compositions and which in addition will impart a high degree of rot and mildew resistance to materials treated therewith.

A further object of my invention is to provide a preservative composition for fibrous materials which will have a prolonged effective life, being particularly resistant to weathering and laundering.

Briefly stated, this invention contemplates a flame- and waterproofing composition for woven or matted fibers which comprises chlorinated paraffin waxes combined with an unmodified phenol formaldehyde resin, antimony oxide and calcium carbonate in suitable proportions.

In preparing the impregnating and coating compositions, it is preferred to use two types of chlorinated paraffin waxes. One has a high chlorine content, that is, about 70% of chlorine, and a high degree of stability. The other has a chlorine content of about 42% to insure proper flexibility and maximum protection in the final product. This combination of chlorinated paraffins forms the primary element of the composition serving both as a flameproofing and waterproofing agent.

Powdered antimony oxide is utilized in the composition to augment the flameproofing characteristics thereof. The combination of antimony oxide and chlorinated paraffins is fairly effective as a protective composition but other ingredients must be admixed therewith to obtain optimum results.

Finely divided calcium carbonate is employed in the composition to neutralize chlorine or hydrogen chloride liberated upon decomposition of the chlorinated paraffins thus protecting the base material. This calcium carbonate will also assist in the flameproofing since a portion of the chlorine liberated by thermal decomposition of the chlorinated paraffin will react therewith forming calcium chloride and carbon dioxide both effective firefighting agencies. The amount of calcium carbonate entering the composition will be dependent upon the ratios of chlorinated paraffins included therein.

A further essential element in the coating composition is an unmodified phenol-formaldehyde resin. This resin, preferably in the A-stage, that is, in the soluble and fusible form, imparts additional body to the protective composition. The resin also serves to unite the other ingredients of the composition after application thereof to the base material being treated. A further advantage which arises from use of the resin is found in its capacity to serve as an additional waterproofing agent.

A small amount of aluminum stearate or other metallic soap is preferably incorporated in the combination to assist in blending the other ingredients thereof.

The various elements of the composition are combined and mixed on a roller mill, approximately 7% by weight of a suitable aromatic hydrocarbon solvent, such as toluene, solvent naphtha, or a ketone solvent, such as methylethyl ketone, being incorporated therewith to assist in the milling operation. Other mixing devices may be employed to equal advantage although some alteration in the composition may be necessary in this event. For example, if a ball or pebble mill is to be used, the amount of solvent employed should be increased to approximately 13% by weight of the composition.

The milling operation provides a workable mixture ready for direct application to the base material. The composition as it comes from the mill, however, may be thinned with suitable vehicles, for example, hydrocarbon solvents including toluene and solvent naphtha, to facilitate the application thereof. The more fluid compositions are applied to fabrics or other materials by painting, spraying, dipping, roller coating, or by any of the other standard methods well known to the art.

The following examples are illustrative of composition applicable for use according to the present invention:

Example I

| | Percentage by weight |
|---|---|
| Phenol formaldehyde resin | 4.5 |
| Chlorinated paraffin (42%) | 26.9 |
| Chlorinated paraffin (70%) | 16.0 |
| Calcium carbonate (finely divided) | 24.00 |
| Antimony oxide | 19.71 |
| Aluminum stearate | 1.2 |
| Solvent | 7.69 |
| | 100.00 |

Example II

| | Percentage by weight |
|---|---|
| Phenol formaldehyde resin | 6.5 |
| Chlorinated paraffin (42%) | 17.8 |
| Chlorinated paraffin (70%) | 24.0 |
| Calcium carbonate (finely divided) | 22 |
| Antimony oxide | 14.7 |
| Aluminum stearate | 1.0 |
| Solvent | 14 |
| | 100.0 |

By controlling the amount of solvent or thinner in the treating composition or by adjusting the number of applications, it is possible to regulate the weight of solids which will be deposited in and around the fibers of the base material. For adequate protection it is desirable that there be an increase of at least 30% in weight of the untreated material representing the amount of deposited solids. It is manifest that a higher degree of protection will be obtained with the application of still greater amounts of the treating composition. The upper limit to the amount of solids deposited on the base material will, of course, be governed by the economics of the treating process.

The perservative composition described herein is colorless. It may, therefore, be applied to dyed fabrics without markedly masking or otherwise impairing the color thereof. If desired, various pigments may be incorporated in the preservative composition thus making it available in a wide range of colors, for application to undyed materials.

What I claim is:

A substantially colorless, fire- and waterproofing composition consisting of approximately 42 percent by weight of a mixture of chlorinated paraffins, one having a chlorine content of about 70 percent and the other a chlorine content of about 42 percent, from 4.5 to 6.5 percent by weight of an unmodified phenol-formaldehyde resin which is in the soluble, fusible stage, from 22 to 24 percent by weight of finely divided calcium carbonate, from 14.7 to 19.7 percent by weight of antimony oxide, and approximately 1 percent by weight of aluminum stearate, said composition being admixed in the presence of from 7 to 14 percent by weight of an aromatic hydrocarbon solvent.

JAMES F. McCARTHY.

REFERENCES CITED

The following references are of record in the file of this patent:

UNITED STATES PATENTS

| Number | Name | Date |
|---|---|---|
| 2,299,612 | Clayton et al. | Oct. 20, 1942 |

FOREIGN PATENTS

| Number | Country | Date |
|---|---|---|
| 846,522 | France | Sept. 19, 1939 |

OTHER REFERENCES

Pages 203 to 205, Chemical Industries, Feb. 1944.

Baekeland-Jour., Ind. & Eng. Chem., March 1909, p. 155.

"Clorafin," Hercules Powder Co., received in Div. 50, Dec. 4, 1944, pages 1, 4, 6 and 7.